United States Patent [19]

Bourkland et al.

[11] 4,084,109
[45] Apr. 11, 1978

[54] HIGH-CURRENT POWER SUPPLY FOR ACCELERATOR MAGNETS

[75] Inventors: Kenneth R. Bourkland, Naperville, Ill.; Russell A. Winje, Princeton Junction, N.J.

[73] Assignee: The United States of America as represented by the United States Department of Energy, Washington, D.C.

[21] Appl. No.: 694,118

[22] Filed: Jun. 8, 1976

[51] Int. Cl.² .............................................. H03K 3/00
[52] U.S. Cl. .... 307/108; 307/104; 307/88 MP; 361/139
[58] Field of Search ........... 307/88 MP, 104, 106, 108; 361/139, 143, 152, 153, 156

[56] References Cited
U.S. PATENT DOCUMENTS

| | | | |
|---|---|---|---|
| 3,849,620 | 11/1974 | Lourigan | 307/108 |
| 3,708,685 | 1/1973 | Miller | 307/104 |
| 3,984,751 | 10/1976 | Iwata | 307/104 |

*Primary Examiner*—Gene Z. Rubinson
*Assistant Examiner*—William L. Feeney
*Attorney, Agent or Firm*—Dean E. Carlson; Frank H. Jackson; Donald P. Reynolds

[57] ABSTRACT

A power supply for controlling the current to accelerator magnets produces a high current at a precisely controlled time rate of change by varying the resonant frequency of an RLC circuit that includes the magnet and applying the current to the magnet during a predetermined portion of the waveform of an oscillation. The current is kept from going negative despite the reverse-current characteristics of thyristors by a quenching circuit.

6 Claims, 3 Drawing Figures

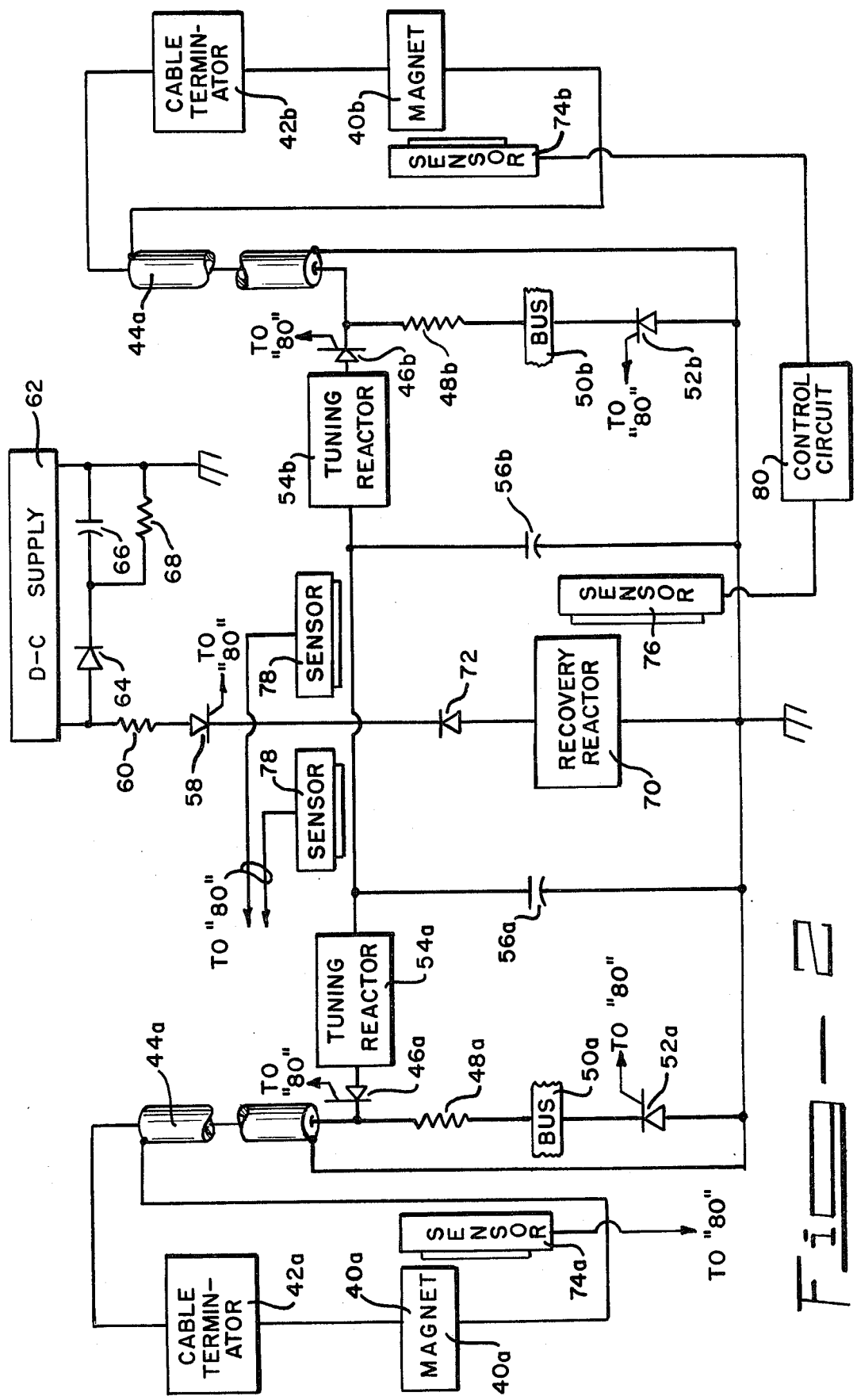

HIGH-CURRENT POWER SUPPLY FOR ACCELERATOR MAGNETS

CONTRACTUAL ORIGIN OF THE INVENTION

The invention described herein was made in the course of, or under, a contract with the United States Energy Research and Development Administration.

BACKGROUND OF THE INVENTION

This invention relates to an electric circuit for precise control of the rate of change and the direction of flow of electric current through an electromagnet.

Control of large accelerators of charged particles frequently involves the control with considerable precision of large electromagnets which control the bending radius of charged particles that are being accelerated. A particular such problem arose in the control of injection of protons at an energy ot 200 MeV into an 8-GeV booster synchrotron at the Fermi National Accelerator Laboratory. In order to achieve multi-turn injection, it was desired to "bump" the beam in the synchrotron by the use of two magnets of equal characteristics, one producing a deflection in one direction and the other restoring the original direction. The beam is thus shifted to a track parallel to its original track. After injection of particles, a second such pair of magnets will return the beam to its original path. In effect, the particles already injected and circling in the synchrotron are bumped in their orbits to clear the point of injection and hence permit injection of other particles into the closed orbit. In order to achieve the required peak magnetic fields of 5500 Gausses (0.55 Tesla) in the magnets that were selected, it was necessary to develop a peak current of 55,000 amperes in each magnet. The field in each magnet was required to decrease linearly at rates varying from 240 Gausses (0.0240 T) per microsecond to 103 Gausses (0.0103 T) per microsecond and the pulse repetition rate was required to be 15 pulses per second. This allowed the filling of orbits side by side. The application of a proper bumping field to charged particles in an orbit within the synchrotron requires that the magnet current be prevented from going through zero and achieving negative values since this would place the orbits of the charged particles in a region where it would intersect portions of the interior confining structure of the accelerator and be lost. While silicon-controlled rectifiers, the most useful thyristors in an application such as this, are frequently idealized as devices which have zero reverse current, the real-life deviation of ten to fifteen percent from this value can interfere seriously with accelerator operation if negative currents are caused to flow in a bumping magnet.

It is an object of the present invention to provide a better power supply for a magnet.

It is a further object of the present invention to provide a power supply to control the current in an electromagnet at a known rate of change decreasing to zero.

It is a further object of the present invention to limit the reversal of electric current in an electromagnet to a value close to zero.

Other objects will become apparent in the course of a detailed description of the invention.

SUMMARY OF THE INVENTION

A power supply for a bumping magnet in a particle accelerator includes a d-c supply to charge a capacitor bank to predetermined voltage, a tuning reactor to make a resonant circuit with the capacitor bank and the magnet, a bypass circuit to keep manget current from becoming negative, and a recovery reactor to restore the capacitor bank polarity, thus minimizing energy loss.

BRIEF DESCRIPTION OF THE DRAWINGS

FIG. 2 is a schematic diagram of a circuit for the pratice of the present invention.

DETAILED DESCRIPTION OF THE INVENTION

Figure 1:
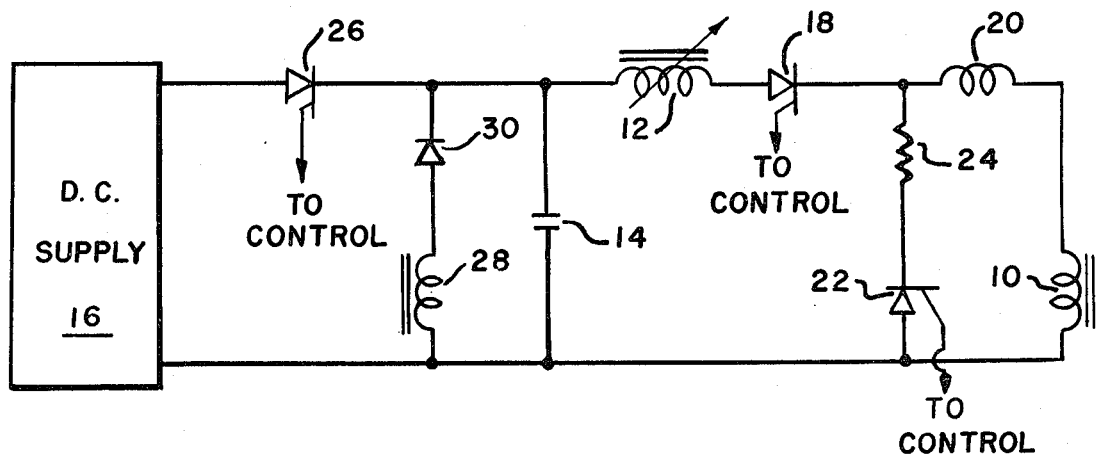
FIG. 1 is a functional circuit diagram indicating the principles of operation of the present invention.

FIG. 1 is a functional circuit drawing illustrating the operation of the present invention. In FIG. 1, magnet 10 forms a resonant circuit when connected in series with tuning reactor 12 across the terminals of capacitor 14. Capacitor 14 is charged to a predetermined voltage as a result of a connection to d-c supply 16. When thyristor 18 is triggered to make it approach a short circuit, capacitor 14 discharges through tuning reactor 12 and square-loop reactor 20 to produce in magnet 10 a current that would, if allowed, oscillate at the resonant frequency of the underdamped RLC circuit. Such an oscillation would produce current flow in alternate directions in magnet 10. It has been explained above that current flow is normally desired in one direction only. In principle, thyristor 18 is a unidirectional conductor that would allow current flow in only one direction. In practice, however, thyristors capable of handling large currents will permit currents to flow in a negative direction to a magnitude as great as 10-15% of the peak current while the thyristor is going out of conduction. These negative currents can be prevented by the combination of bypass thyristor 22, which injects a reverse current to cut off thyristor 18, and square-loop reactor 20, which presents a high reactance at low values of current to prevent reverse current from flowing in magnet 10. The amount of bucking current in bypass thyristor 22 is limited to a safe value by resistor 24 and circuit operation is further facilitated by thyristor 26 which connects d-c supply 16 to charge capacitor 14 and disconnects capacitor 14 from d-c supply 16 when capacitor 14 has recharged to the predetermined value. Recovery reactor 28 is connected in series with diode 30 and the series combination is connected in parallel with capacitor 14 to assist in restoring the original polarity of the electrical energy stored in capacitor 14.

FIG. 2 is a schematic circuit diagram of an apparatus for the practice of the present invention. When this invention is applied to control the current to a bumping magnet in an accelerator, it is useful to apply it to a pair of magnets with equal and opposite fields that shift a beam parallel to itself. Accordingly, FIG. 2 contains identical portions which are distinguished by the letters "a" and "b." In FIG. 2, magnets 40a and 40b are each connected in series with cable terminators 42a and 42b. Cable terminators 42a and 42b serve dual functions. One is to collect the current flowing through a plurality of paralleled coaxial cables 44a and 44b. The other is to serve as a switching reactor in a way that will be described more fully below. Each coaxial cable 44a and each coaxial cable 44b is connected to a thyristor 46a and 46b, respectively. Thyristors 46a represent a number of switching elements such as silicon-controlled rectifiers (SCRs) with the number chosen to handle the desired current with a safety factor. The cathode of each thyristor 46a and 46b is connected through its own balancing resistor 48a and 48b to a bus 50a and 50b, respectively. Bus 50a is connected through thyristor 52a to ground. The anodes of thyristors 46a and 46b are connected to tuning reactor 54a and 54b, respectively. Each tuning reactor is connected to one terminal of capacitor bank 56a and 56b, respectively. The other terminal of each capacitor bank is connected to ground.

The foregoing elements of FIG. 2 comprise the identical paralleled structures that are designed to deliver identical currents to each of two bumping magnets. The remaining elements of the circuit of FIG. 2 are in general not repeated. Thus, capacitor banks 56a and 56b are themselves connected in parallel and their terminals that are common with tuning reactors 54a and 54b, respectively, are connected to charging thyristor 58. Although charging thyristor 58 may comprise a series combination of elements, it serves as a single switch to connect resistor 60 and d-c supply 62 to capacitor bank 56. Commutating SCR 64 is connected to one terminal of d-c supply 62, thence to the parallel combination of capacitor 66 and resistor 68. The circuit is completed with the series combination of a recovery reactor 70 which is connected in series with a diode 72 across capacitor banks 56. Operation of the circuit is facilitated by flux change sensors 74a and 74b which are coupled to respond to changes in the magnetic fields of magnets 40a and 40b, respectively; by sensor 76, coupled to respond to flux change in recovery reactor 70, and by imbalance-current sensor 78, responsive to zero net current. Sensors 74 and 76 are connected to control circuit 80 to monitor and control the operation that will now be described.

The combination of capacitor bank 56, tuning reactor 54, magnet 40, and the associated elements connected thereto, comprises an oscillatory RLC circuit. It is well known that when a charged capacitor is connected to form part of an RLC circuit the current flow in any element of the circuit is in the form of an exponentially damped sinusoid. Where the series resistance is relatively low or the parallel resistance is relatively high, so that the damping is slight, the damped sinusoid is close to a pure sinusoid. The portion of a sinusoid approaching zero is approximately linear and it is that range of current values that is used in the present invention to achieve a bump in the beam orbit that is very nearly linear as a function of time.

Operation of the circuit of FIG. 2 proceeds as follows. Charging thyristor 58 which is connected to control circuit 80 is caused to conduct to charge capacitor banks 56 to a predetermined value of voltage, at which point thyristor 64 is caused to conduct. At this time, thyristors 46 have not been triggered to fire and hence constitute essentially open circuits. Diode 72 is back-biased when capacitor banks 56 are being charged, so that in effect only capacitor banks 56 are connected to charging thyristor 58. When capacitor banks 56 are charged, the circuit is in a ready condition. At a predetermined time, thyristors 46 are triggered into conduction by control circuit 80. This begins the discharge of the voltage on capacitor banks 56 through tuning reactors 54, a cable terminators 42, and magnets 40. Cable terminators 42 contain a square-loop ferromagnetic material in a quantity sufficient to cause each cable terminator 42 to appear as a high value of reactance over a small range of currents about zero. After this range is exceeded, cable terminators 42 are essentially short circuits and do not affect the rise of currents in magnets 40 to a peak value at a frequency determined primarily by the reactance of tuning reactors 54, magnets 40, and capacitor banks 56. Sensors 74 perform dual functions: they monitor the time rate of change of the magnetic fields of magnets 40 to facilitate adjustment of pulse width by tuning reactors 54 and they serve as fault detectors. The integrated output of sensor 74 also indicates the magnetic flux density. Sensor 78 facilitates balancing of outputs by fine adjustments of reactors 54. A significant difference in the detected flux changes between sensors 74a and 74b is an indication of a fault in the system which enables the system to be shut down to minimize damage to components.

Operation of the circuit of FIG. 2 to control bumping magnets requires a magnetic field that starts at a predetermined value and decreases to zero. As stated previously, it is desired to operate thyristors 52 subject to the control of control circuit 80 when the magnetic fields of magnets 40 have dropped to zero. This control is effectuated by integrating the changing magnetic fields detected by flux change sensors 74a and 74b. Time integrals of these signals provide a measure of zero magnetic field. This provides a signal to control circuit 80 which directs the control of thyristors 52 to operate and cause a current flow to stop the conduction of thyristors 46. This current flow is injected into thyristors 46 so as to switch thyristors 46 to the nonconducting state without permitting the magnetic field of magnets 40 to achieve more than a negligibly small value of magnetic field in the sense accompanying a negative current flow therethrough. The switching is facilitated by the reactance of cable terminators 42. Because of the square-loop material in cable terminators 42, both cable terminators appear as highly inductive elements at low values of current. This has the effect of causing a relatively high voltage to appear across cable terminators 42 in a sense to oppose the current flow therethrough and hence to assist in cutting off current flow through magnets 40 at a value very close to zero.

When the current in magnets 40 has been thus interrupted, the voltage across capacitor banks 56 has achieved a magnitude that is close to, but somewhat less than, the magnitude of the d-c supply voltage, but the sense of that voltage is opposite to its original state of charge. The ready condition of capacitor banks 56 is restored by the series combination of recovery reactors 70 and diode 72 which is connected across capacitor banks 56 to ring the voltage in the opposite direction.

Recovery proceeds by a buildup of current flow in the upward direction through recovery reactor 70 to a peak value. This current then declines to zero as capacitor banks 56 are being recharged. Diode 72 prevents the current from going in a reverse direction, thus holding the state of charge achieved by capacitor banks 56. Charging thyristor 58 is then caused to conduct under the control of control circuit 80 to make up the losses occurring primarily as dissipation in resistive elements of the circuit. Recovery reactor 70 combines with diode 72 to restore the voltage on capacitor banks 56 to the order of 90% of the initial negative value after the magnet pulse. The remaining 10% of the voltage is restored by current flow through charging thyristor 58. Precision control of the voltage to which capacitor banks 56 are charged is achieved by causing commutating thyristor 64 to be short-circuited under the control of control circuit 80. This permits current flow from capacitor bank 56 via thyristor 58 as well as from d-c supply 62 to charge capacitor 66. The result is to back-bias charging thyristor 58, permitting it to cease conduction and isolating the d-c supply 62 from capacitor bank 56. Resistor 68 serves to discharge capacitor 66. The circuit is now charged and ready for the next cycle.

Figure 3:
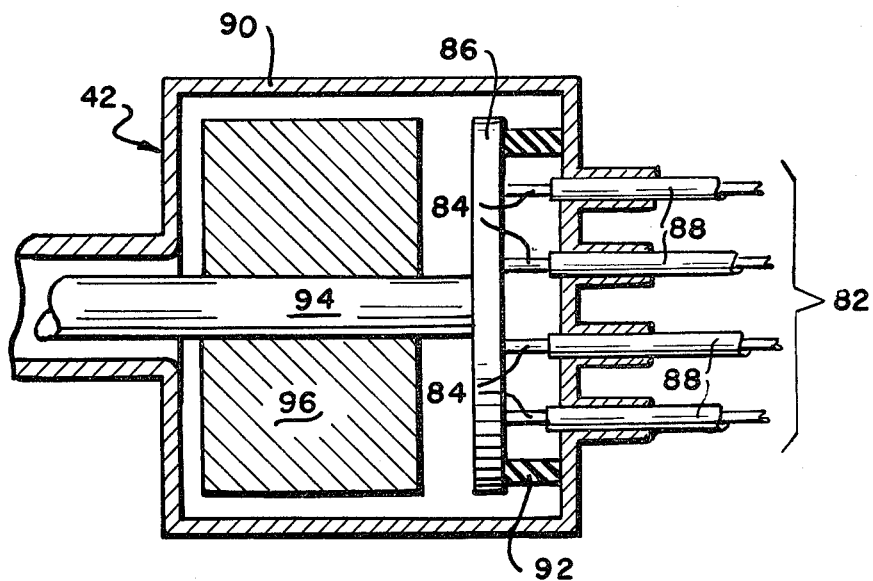
FIG. 3 is a sectional side view of the cable terminator of FIG. 2.

FIG. 3 is a cross-sectional view of the cable terminator 42 of FIG. 2. In FIG. 3, a plurality of coaxial cables 82 are connected in parallel to carry magnet currents. The center conductors 84 of the coaxial cables 82 are connected to plate 86 which thus serves as a current collector. The outer conductors 88 are connected to a housing 90 which, in turn, is electrically grounded. Center conductors 84 provide support to 86, while insulator 92 insulates plate 86 electrically from housing 90. Conductor 94 carries the current collected by plate 86 and also serves as a reactor as a result of the presence of square-loop ferromagnetic material 96, a toroidal structure surrounding conductor 94. The term "square-loop" refers to the hysteresis curve of the material 96 and is typically a substance such as Deltamax, a trademark for a commercially obtainable ferromagnetic material. The quantity of square-loop ferromagnetic material 96 is selected by routine design procedures to saturate magnetically when the current through conductor 94 is of the order of 0.1% of its peak design value (approximately 40 A out of 55,000 A). When square-loop ferromagnetic material 96 is magnetically saturated, it has no electrical effect on the circuit and hence conductor 94 serves purely as a conductor. However, when the current through conductor 94 is low enough in value to cause square-loop ferromagnetic material 96 to come out of saturation, then conductor 94 appears electrically to be inductive at a relatively high value of reactance. The effect of this reactance has already been described above in connection with the operation of the circuit of FIG. 2.

A circuit for the practice of the present invention has been built and used to facilitate the injection of protons at an energy of 200 MeV into the Booster synchrotron at the Fermi National Accelerator Laboratory. The magnets 40 and the cable terminators 42 were located in an area that is inaccessible to personnel during operation because of the threat of radiation. Coaxial cable 44 established a current connection to the radiation area. Coaxial cables 44a and 44b each comprised 20 RG-220 cables in parallel to carry the required peak current of 55,000 amperes for each magnet 40. The cables 44 also served as equalizing impedances to facilitate proper current division among thyristors 46, which were SCRs. Capacitor banks 56 each comprised a number of capacitors adjustable in value from 500 to 1200 microfarads. Tuning reactors 54 were adjustable to provide in combination with the preselected values of capacitor banks 56a a choice of resonant frequencies between 2.98 kHz to 6.95 kHz. The magnetic fields of the magnets 40 were required to decrease at rates variable from 240 Gausses per microsecond to 103 Gausses per microsecond and the two magnets 40a and 40b were required to track within 0.1%. The fine tuning to accomplish tracking requires adjustment of tuning reactors 54a and 54b. Capacitor banks 56 were charged to a maximum voltage of 2400 volts d-c. The circuit was operated at a pulse repetition rate of 15 pulses per second. Thyristors 46a and 46b each comprised 20 parallel combinations each of two series silicon-controlled rectifiers. The series-parallel combination provided a peak current rating for each thyristor 46 of 3300 amperes. Each bypass switch 52 comprised three silicon-controlled rectifiers connected in series with a paralleling RC network placed across each to insure equal voltage division. Similar networks were used to insure equal voltage division with the thyristors 46, 52, 58, and 64, and diodes 72, all of which comprised combinations of single elements as needed to handle the desired voltages and currents. Each bus 50 was connected to one terminal of each of 20 balancing resistors 48a and 48b to balance the bypass current supplied to each of the thyristors 46. The recovery reactor was a high-Q inductor with an inductance of about 350 microhenries.

The embodiments of the invention in which an exclusive property or privilege is claimed are defined as follows:

1. A power supply for delivering a controlled current to a coil comprising:
   a capacitor connected at a first end to the coil;
   means connected electrically to the capacitor for charging the capacitor to a predetermined value of voltage;
   an adjustable tuning inductor connected electrically to the capacitor at a second end;
   a first thyristor connected electrically in series with the tuning inductor;
   a cable system connected electrically in series with the first thyristor;
   a switching reactor connected electrically in series with the cable system and the coil to form a series circuit with the capacitor, the tuning inductor, the first thyristor, and the cable system;
   a bypass thyristor connected electrically in parallel with the coil and the switching reactor; and
   control means connected to the charging means, the first thyristor, and the bypass thyristor for controlling the predetermined value of voltage and the operation of the thyristors.

2. The apparatus of claim 1 wherein the capacitor comprises a capacitor bank.

3. The apparatus of claim 1 wherein the means for charging the capacitor comprise a d-c supply having two terminals, one of said two terminals connected to the first end of the capacitor, and a thyristor connected between the other of said two terminals and the second end of the capacitor, the thyristor further connected to the control means for controlling firing of the thyristor.

4. The apparatus of claim 1 wherein the cable system comprises a plurality of parallel coaxial cables.

5. The apparatus of claim 4 wherein the switching reactor comprises a plate connected to and terminating the parallel coaxial cables, a conductor connected to and extending from the plate, a quantity of ferromagnetic material exhibiting a substantially square B-H curve surrounding and enclosing axially a part of the conductor, the quantity selected to saturate magnetically at a current of the order of 0.1% of a design maximum value of current, and an electrically conductive housing surrounding and insulated electrically from the plate, conductor, and ferromagnetic material.

6. A power supply for supplying electrical current to each one of a pair of accelerator orbit-bumping magnets at a controlled value and a controlled rate of decrease substantially to zero, the supply comprising:
a control unit;
a d-c supply having a first terminal and a second terminal, the second terminal connected to a ground;
a commutating thyristor connected to the first terminal of the d-c supply;
a parallel resistor and capacitor connected in series with the commutating thyristor and connected to the second terminal of the d-c supply to form with the d-c supply a series circuit;
a first resistor connected to the first terminal;
a first thyristor connected to the first resistor to control current therethrough and connected to the control unit to receive therefrom a control signal;
a first capacitor bank connected to the first thyristor and to the ground to charge to a voltage determined by the d-c supply and the control unit;
a first tuning reactor connected to the first capacitor bank to receive current therefrom and to resonate therewith;
a plurality of second thyristors, each connected to the first tuning reactor and to the control unit to switch current through the first tuning reactor under control of the control unit;
a plurality of first balancing resistors, each connected at a first end to one of the second thyristors;
a first bus connected to a second end of each of the first balancing resistors;
a third thyristor connected to the first bus, to the ground, and to the control unit to inject a current into the second thyristors at a time determined by the control unit;
a first plurality of coaxial cables, each connected to one of the plurality of second thyristors to carry current therefrom;
a first cable terminator connected to each of the first plurality of coaxial cables and to one of the pair of orbit-bumping magnets to receive current from the coaxial cables and deliver the current to the magnet, the terminator including a quantity of ferromagnetic material disposed to constitute the terminator a saturable reactor;
a second capacitor bank connected to the first thyristor and to the ground to charge to a voltage determined by the d-c supply and the control unit;
a second tuning reactor connected to the second capacitor bank to receive current therefrom and to resonate therewith;
a plurality of fourth thyristors, each connected to the second tuning reactor and to the control unit to switch current through the second tuning reactor under control of the control unit;
a plurality of second balancing resistors, each connected at a first end to one of the fourth thyristors;
a second bus connected to a second end of each of the second balancing resistors;
a fifth thyristor connected to the second bus, to the ground, and to the control unit to inject a current into the fourth thyristor at a time determined by the control unit;
a second plurality of coaxial cables, each connected to one of the plurality of fifth thyristors to carry current therefrom;
a second cable terminator connected to each of the second plurality of coaxial cables and to the other of the pair of orbit-bumping magnets to receive current from the coaxial cables and deliver the current to the magnet, the terminator including a quantity of ferromagnetic material disposed to constitute the terminator a saturable reactor;
a recovery reactor having a first terminal connected to the ground and having a second terminal;
a free-wheeling diode connected to the second terminal of the recovery reactor and to the first and second capacitor bank to conduct current to charge and discharge the recovery reactor;
a first flux-change sensor coupled to the first magnet and connected to the control unit to supply flux-change information thereto;
a second flux-change sensor coupled to the second magnet and connected to the control unit to supply flux-change information thereto;
a third flux-change sensor coupled to the recovery reactor and connected to the control unit to supply thereto information about energy stored in the recovery reactor; and
an imbalance-current sensor coupled to the first and second capacitor banks and to the control unit and responsive to any difference in currents in the first and second capacitor banks to supply fault information to the control unit.

* * * * *